United States Patent [19]

Setree, II

[11] 4,293,056

[45] Oct. 6, 1981

[54] DEVICE FOR LUBRICATING A HUB WITH BEARINGS

[76] Inventor: Robert R. Setree, II, 820 S. Buckeye, Kokomo, Ind. 46901

[21] Appl. No.: 14,970

[22] Filed: Feb. 26, 1979

[51] Int. Cl.³ .......................................... F01M 11/00
[52] U.S. Cl. ................................ 184/1 D; 184/105 B
[58] Field of Search .................. 184/1 D, 1 R, 105 B; 308/93; 305/14

[56] References Cited

U.S. PATENT DOCUMENTS

| | | | |
|---|---|---|---|
| 2,160,214 | 5/1939 | Jackson | 184/1 D |
| 2,438,128 | 3/1948 | Poyner | 184/1 D |
| 2,656,012 | 10/1953 | Thorpe | 184/1 D |
| 2,911,068 | 11/1959 | Wright | 184/1 D |
| 4,113,059 | 9/1978 | Markovski | 184/1 D |

Primary Examiner—David H. Brown
Attorney, Agent, or Firm—Woodard, Weikart, Emhardt & Naughton

[57] ABSTRACT

A device to lubricate bearings mounted within a wheel hub. A main body includes a grease fitting at one end which is in fluid communication with a passage opening between a pair of O-rings mounted to the main body of the lubricator. A bracket on the lubricator locates the O-rings on the opposite sides of the bearing being lubricated. In an alternate embodiment, a pair of ridges are provided on the main body in lieu of the O-rings.

6 Claims, 6 Drawing Figures

U.S. Patent  Oct. 6, 1981  Sheet 1 of 2  4,293,056

DEVICE FOR LUBRICATING A HUB WITH BEARINGS

BACKGROUND OF THE INVENTION

This invention is in the field of lubricating devices. Various vehicles including automobiles and motorcycles are supported for movement by wheels rotatably mounted upon axles. Each wheel typically includes a hub with a pair of rolling contact bearings through which the axle projects. Normally, each bearing is retained within the hub by means of a removable spring clamp. In order to effectively lubricate the bearings, the clamps must first be removed and then the bearings physically removed from the hub. The clamps frequently are difficult to remove and in fact break in certain instances. Therefore, it is desirable to lubricate the bearings while mounted within the hub. Several devices have been designed to achieve this objective. For example, the U.S. Pat. No. 2,160,214 issued to Jackson discloses a pair of mutually opposed cones which project partially into the hub from opposite sides being threadedly mounted on a perforated tube through which grease flows to the bearings. Another device for flushing and lubricating a roller bearing is shown in U.S. Pat. No. 2,210,478 issued to Berg. Various types of grease guns and lubricators which use a number of different types of movable components have been devised such as shown in U.S. Pat. Nos. 3,158,226 issued to Williamson, 3,717,222 issued to Moline and 4,113,059 issued to Markovski.

The prior devices which include movable parts, such as spring-biased pistons for injecting the lubricating medium, or other lubricators which require assembly and disassembly of components in order to insert the lubricator through the hub, are particularly troublesome since old grease and dirt accumulate on the various components and threaded surfaces necessitating frequent cleaning of the lubricators for proper use. Disclosed herein is a new and improved lubricator which may be extended through the hub while the bearings are in place and which does not require assembly or disassembly of various lubricator components prior to each lubrication.

SUMMARY OF THE INVENTION

One embodiment of the present invention is a device for lubricating a hub and bearings mounted therein comprising a one-piece main body sized to fit through the bearings and into the hub, the main body having a first end and second end, a grease fitting mounted on the first end to receive and apply a flow of grease through the main body, passage means in the main body opening between the first end and second end and aligned and in communication with the fitting to receive a flow of grease and direct same out of the main body to the bearing being lubricated, sealing means on the main body and located adjacent the bearing being lubricated when the main body is located in the hub and being operable to stop grease from flowing out of the hub, and locating means connected to the main body and having a first surface to locate the sealing means adjacent the bearing being located when the main body is positioned within the hub and the first surface is in contact with the hub.

It is an object of the present invention to provide a new and improved lubricator for applying grease to bearings mounted in place within a hub.

A further object of the present invention is to provide a wheel bearing lubricator which does not use movable components for application of the lubricating medium.

In addition, it is an object of the present invention to provide a lubricator for applying grease to wheel bearings which includes means for positioning the lubricator within a wheel hub without the necessity of assembly or disassembly of lubricator components.

Further objects and advantages of the present invention will be apparent from the following description.

DESCRIPTION OF THE PREFERRED EMBODIMENTS

Figure 1:
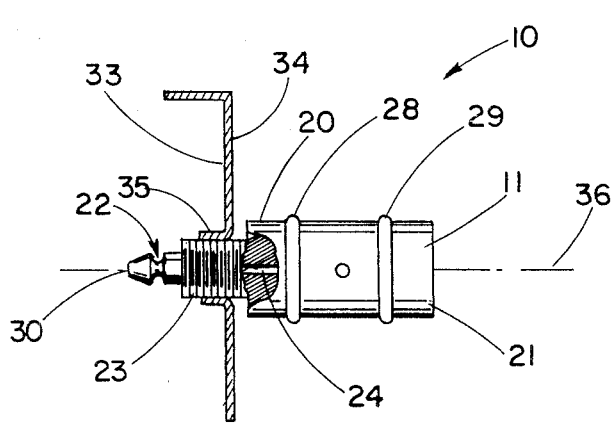
FIG. 1 is a fragmentary side view of a lubricator incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the preferred embodiment of the device for lubricating a hub and bearing. Lubricator 10 includes a main body 11 having a cylindrical configuration being sized to fit within a wheel hub 13 shown in FIG. 4. Typically, hub 13 includes an axle opening 14 within which are mounted a pair of bearings 15 and 16 secured in place by a pair of retainers or spring-biased clamps 17 and 18. In order to use the lubricator disclosed herein, the wheel is first removed from the axle with lubricator 10 then being inserted into the axle hole 14 with the bearings 15 and 16 remaining in place within the hub. A flow of grease to the lubricator is then achieved with the grease eventually flowing from the lubricator into the hub and to one of the bearings being lubricated. Main body 11 (FIG. 1) has a first end 20 and a second end 21 with sufficient length to locate the ends outwardly and on opposite sides of one of the bearings when the lubricator is located within the hub.

In the embodiment shown in FIG. 1, a grease fitting 22 has an externally threaded stem 23 which is threadedly received by a threaded collar 23 integrally attached to end 20 of main body 11 and in communication with passage 24 which extends into main body 11. Alternatively, grease fitting 22 may be press-fitted into the main body of the lubricator. Passage 24 leads to a pair of opposite opened ends 25 and 26 positioned adjacent the bearing being lubricated and in between a pair of seals 28 and 29. Fitting 22 is of conventional design having an inlet 30 to receive a conventional grease applicator thereby allowing for the flow of grease through fitting 22 and into passage 24 exiting ends 25 and 26 of the passage. Passage 24 is aligned and in communication with fitting 30 which may either be threadedly received by the main body or press-fitted into channel 24 as shown in the embodiment of FIG. 2.

Seals 28 and 29 in the embodiment shown in FIG. 1 are rubber O-rings which are removably mounted in a pair of grooves provided on main body 11. The O-rings are located along the length of main body 11 so as to be located on opposite sides of the bearing being lubricated including bearing 15 or 16 of the wheel hub when the main body is extended into the hub. Seals 28 and 29 are operable to stop the grease from flowing out of the hub when the grease flows from ends 25 and 26 of passage 24 and into the particular bearings being lubricated.

A bracket or locating means 33 is connected to main body 11 and has a first surface 34 which is abuttable against hub 13 to locate the seals on the opposite sides of the particular bearing being lubricated and further to locate ends 25 and 26 of passage 24 immediately adjacent the bearing being lubricated. The internally threaded collar 35 of bracket 33 is threadedly mounted on stem 23 so as to provide for the automatic location of seals 28 and 29 with respect to the bearing being lubricated. Thus bracket 33 may be initially moved along the length of stem 23 until the desired spacing from surface 34 to seals 28 and 29 is achieved with respect to the location of the bearing relative to the seals. Surface 34 is perpendicularly arranged to the longitudinal axis 36 of main body 11 to insure the alignment of the lubricator relative to the wheel hub.

Figure 2:
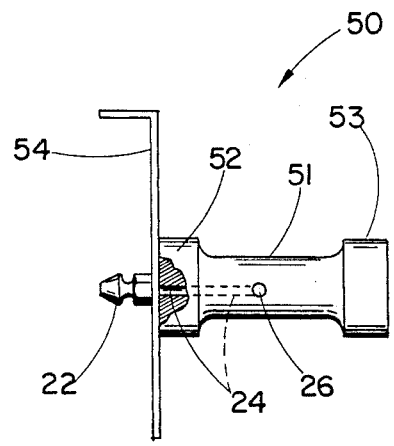
FIG. 2 is the same view as FIG. 1 only showing an alternate embodiment of the lubricator.
Figure 3:
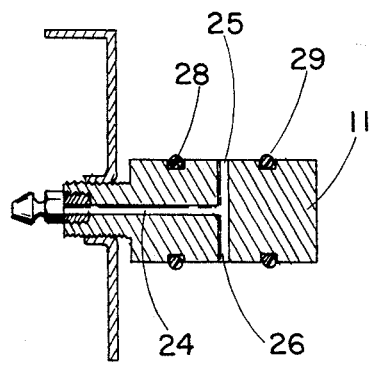
FIG. 3 is a cross sectional view of the lubricator shown in FIG. 1.

Lubricator 50, shown in FIG. 2, is identical to the lubricator shown in FIG. 1 with the exception that bracket 54 is secured to main body 51 by fitting 22 in lieu of threaded stem 23 and further with the exception of a pair of ridges being used in lieu of the O-rings to achieve proper sealing. The bracket mounted to the lubricator of FIG. 2 is not adjustable to and from the sealing means. Lubricator 50 as well as lubricator 10 includes a cylindrical main body with a passage 24 leading from the grease fitting 22 to a pair of opposed opened ends 25 and 26 located between the sealing means to allow the grease to flow from fitting 22 and out through open ends 25 and 26 to the wheel bearing. A pair of cylindrical ridges 52 and 53 are formed at the opposite ends of main body 51 with the open ends 25 and 26 of passage 24 being located between ridges 52 and 53. The ridges are of a sufficiently small diameter so as to pass through the inner ring of the bearing being lubricated. The viscosity of the lubricant used, as well as the amount of pressure applied to the lubricant, will determime whether or not ridges 52 and 53 actually provide a sealing action. In certain cases with low lubricant pressure and a thick lubricant, the gap between the ridges and the axle hub is sufficiently small so as to limit the outward flow of the lubricant. Bracket 54 is identical to bracket 33 with the exception that bracket 54 does not include a threaded collar and instead collar 22 extends merely through an appropriate size aperture of bracket 54 with the bracket being fixedly mounted to main body 51 and not being adjustable thereon. Both brackets 33 and 54 are L-shaped in configuration to facilitate the handling of the bracket.

Figure 4:
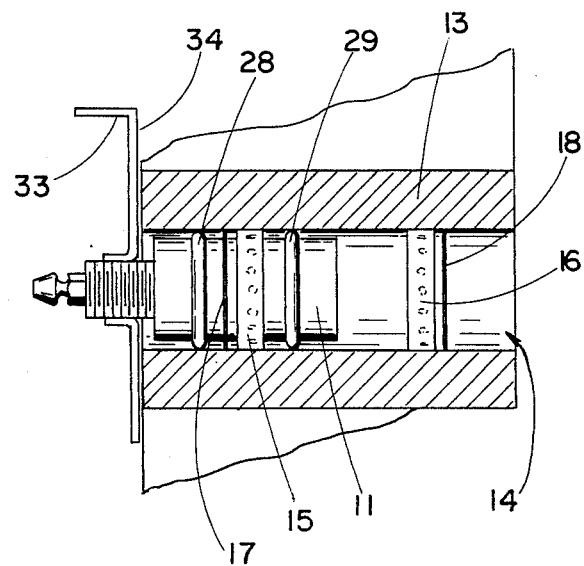
FIG. 4 is a fragmentary cross-sectional view showing the lubricator of FIG. 1 mounted within a wheel hub.

Best results have been obtained using a brand-name multipurpose grease with a 180° C. drip point. The grease should first be pumped through the lubricator until the grease comes out the opposite ends 25 and 26 of passage 24. At this point, the lubricator may be inserted into the bearing which is retained in the wheel. Once the bearing has been lubricated, such as bearing 15 shown in FIG. 4, the lubricator is then removed and reinserted in the opposite side of the wheel so as to lubricate the opposite bearing which would be bearing 16 as shown in FIG. 4. The lubricator provides for the lubrication of one bearing at a time.

Figure 5:
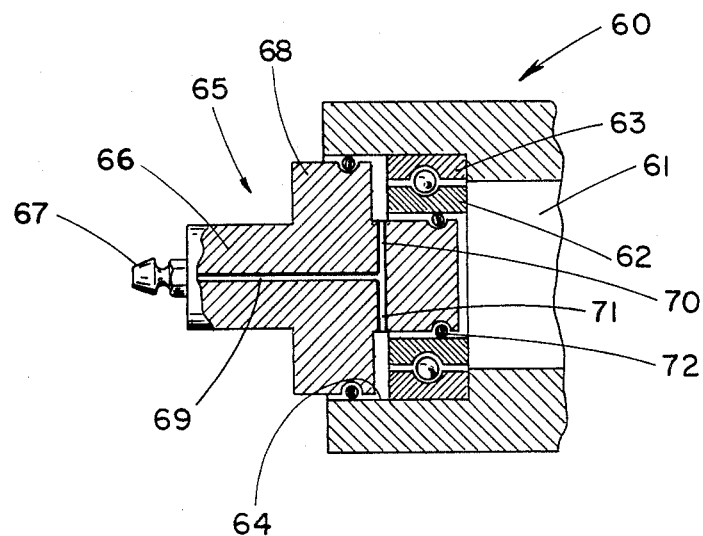
FIG. 5 is a fragmentary cross-sectional view showing a third embodiment of the lubricator mounted within a wheel hub.

The third embodiment of the lubricator incorporating the present invention is shown in FIG. 5 mounted within a wheel hub. Hub 60 is of a conventional design having an axle passage 61 provided at its opposite ends with an enlarged recess 64 which receives a conventional ball bearing assembly including an inner race 62 and an outer race 63.

Lubricator 65 has a main body 66 with a grease fitting 67 provided thereon. Fitting 67 is in communication with a passage 69 extending through main body 66 and branching off into passage legs 70 and 71 opening into recess 64 to allow the flow of grease into recess 64 and subsequently through the ball bearing assembly. Main body 66 includes an enlarged continuous circular rib 68 provided with a conventional O-ring seal which sealingly engages the side wall forming recess 64. In addition, a continuous O-ring seal 72 is provided on the innermost portion of main body 66 to sealingly engage inner race 62.

Figure 6:
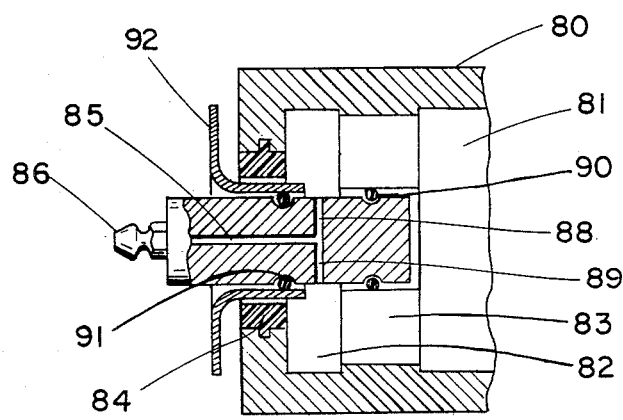
FIG. 6 is a fragmentary cross-sectional view showing a fourth embodiment of the lubricator mounted within a wheel hub.

The fourth embodiment of the lubricator is shown in FIG. 6 mounted within a conventional wheel hub 80 having a central axle passage 81 with outer recesses 82 provided at the opposite ends of the axle passage. Bearing 83 separates recess 82 from passage 81 but is provided with an aperture through which the main body of the lubricator extends.

The lubricator is provided with a conventional grease fitting 86 in communication with passage 85 extending through the lubricator and branching into legs 88 and 89 opening into recess 82. The lubricator includes a conventional O-ring seal 90 which engages the inner surface of bearing 83 thereby preventing grease flow into passage 81. A second O-ring seal 91 is provided to effect a seal between the lubricator and the normal seal 84 mounted to axle hub 80. Due to the spacing between seal 84 in the main body of the lubricator, an auxiliary bracket 92 is fitted tightly through seal 84 so as to engage O-ring seal 91.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A device for lubricating a hub and bearings mounted therein comprising:
a one-piece main body sized to fit through said bearings and into said hub, said main body having a first end and second end;
a grease fitting mounted on said first end to receive and apply a flow of grease through said main body;

passage means in said main body and having an outlet opening between said first end and second end and aligned and in communication with said fitting to receive a flow of grease and direct same out of said main body to the bearing being lubricated;

sealing means on said main body and located adjacent the bearing being lubricated when said main body is located in said hub and being operable to stop grease from flowing out of said hub; and locating means connected to said main body and having a first surface adjustable to and from said sealing means to locate said sealing means on opposite sides of the bearing being lubricated when said main body is positioned within said hub and said first surface is in contact with said hub while also positioning said outlet adjacent the bearing being lubricated.

2. The device of claim 1 wherein:
said grease fitting is press-fitted into said main body and said locating means is an L-shaped bracket.

3. The device of claim 1 wherein:
said main body has a longitudinal axis perpendicularly arranged relative to said first surface.

4. The device of claim 3 wherein:
said sealing means includes a pair of O-rings removably mounted on said main body and spaced from said first surface to engage said hub on opposite sides of the bearing being located.

5. The device of claim 4 wherein:
said main body is cylindrical in configuration and said passage means includes a passage with at least three ends and with at least two of said ends opening between said O-rings to allow grease to flow between said O-rings and with the other end fittingly receiving said grease fitting.

6. The device of claim 5 wherein:
said locating means includes a bracket with an internally threaded collar receiving said main body.

* * * * *